Feb. 15, 1955     D. OPPENHEIM     2,702,309
BATTERY
Filed March 30, 1954
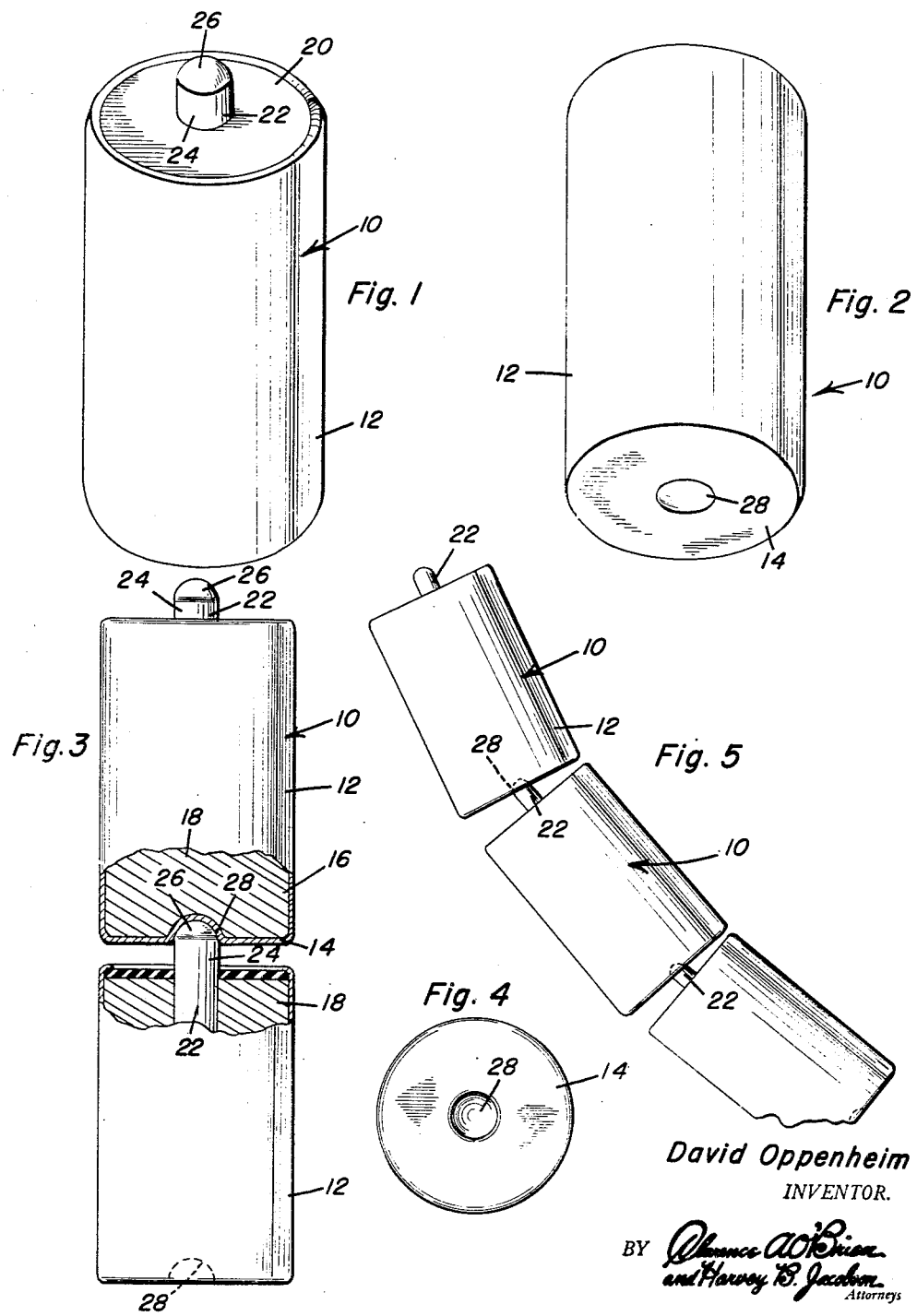
David Oppenheim
INVENTOR.

United States Patent Office 2,702,309
Patented Feb. 15, 1955

2,702,309

BATTERY

David Oppenheim, Forest Hills, N. Y.

Application March 30, 1954, Serial No. 419,722

1 Claim. (Cl. 136—110)

This invention relates to battery construction, and more particularly to a novel battery of the flashlight type provided with means for ensuring that the electrodes of superposed batteries are maintained in effective contact.

The primary object of this invention resides in the provision of a battery construction which eliminates the necessity of using clips or extensions of the shell of the battery for holding and receiving the center electrode of one battery within a portion of the shell of another battery.

Conventional flashlight batteries usually have a contact between the central electrode of one of the batteries and the base of the adjacent battery, which contact is generally of pin-point size and often results in a poor electrical circuit. The arrangement of parts incorporated in the present invention assures that the contact between the adjacent batteries will cover a greater surface and generally result in more effective application of the battery.

Another advantage of the invention resides in the fact that the individual batteries may be angularly disposed relative to each other to some degree while still maintaining a full contact between the batteries.

Still further objects and features of this invention reside in the provision of a battery that is strong and durable, simple and inexpensive to construct and manufacture, thereby permitting wide distribution.

These, together with the various ancillary objects and features of the invention which will become apparent as the following description proceeds, are attained by this battery, a preferred embodiment being illustrated in the accompanying drawings, by way of example only, wherein:

Figure 1 is a perspective view of one of the batteries comprising the present invention;

Figure 2 is another perspective view of the battery;

Figure 3 is an elevational view of a pair of the batteries comprising the present invention being arranged in superposed position, with parts of the batteries being shown in section for greater detail;

Figure 4 is a top plan view of one of the batteries; and

Figure 5 illustrates the manner in which the batteries can be arranged in angular relationship relative to each other, as may be desired.

With continuing reference to the accompanying drawings, wherein like reference numerals designate similar parts throughout the various views, reference numeral 10 generally designates one of the batteries comprising the present invention. Each of the batteries includes a shell 12 formed of any suitable conductive metal and the shell 12 has a base 14 integrally formed or in contact with the cylindrical side walls 16 of the shell. As is conventional, a suitable electrolyte 18 is positioned within the shell 12 and the electrolyte 18 is sealed therein by means of a cover of any suitable material, as at 20. The central electrode 22 is insulated from the cover 20 and spaced from the shell 12 and is positioned within the shell 12 and immersed in the electrolyte 18.

The electrode 22 includes a cylindrical portion 24 which extends upwardly beyond the cover 20. The electrode 22 further terminates in a hemispherical portion 26 having a metal cap which is adapted to seat within a substantially hemispherical recess 28 formed in the base 14 of the shell 12. The hemispherical portion 26 as well as the hemisepherical recess 28 form a ball and socket joint so that the various batteries 10 may be, as is shown in Figure 5, angularly arranged so that the various shells 12 thereof extend at an acute angle relative to each other, thereby permitting these batteries to be utilized in various shaped flashlight casings or the like. Further, the utilization of the cylindrical portion 24 which spaces the hemispherical portion 26 outwardly of the shell results in the holding of the base 14 out of possibility of contact with the shell of an adjacent battery and spaced therefrom. This further ensures that the superimposed battery 10 will be urged by gravity into an optimum electrical contact with the electrode 22 of the battery next below.

From the foregoing, the construction and operation of the device will be readily apparent and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A composite battery arrangement comprising an upper battery positioned above a lower battery, said upper and lower batteries each comprising a cylindrical shell of electrically conductive material having a base, said base having a centrally disposed recess of substantially hemispherical shape therein, said shell forming a first electrode and being filled with an electrolyte, a second electrode of electrically conductive material positioned within said shell out of contact with said shell and having a cylindrical portion extending above said shell, said second electrode terminating at its uppermost part in a substantially hemispherical portion having a metal electrically conductive cap, the recess in said upper battery having received therein the hemispherical portion of said lower battery, said cylindrical portion of said lower battery spacing the shell of said upper battery from the shell of said lower battery, the shell of said upper battery being disposed at an acute angle relative to said shell of said lower battery.

References Cited in the file of this patent

UNITED STATES PATENTS

| | | |
|---|---|---|
| 520,429 | Hoggson | May 29, 1894 |

FOREIGN PATENTS

| | | |
|---|---|---|
| 108,849 | Great Britain | Feb. 28, 1918 |
| 494,929 | Germany | Mar. 13, 1930 |